(12) United States Patent
Sun et al.

(10) Patent No.: US 12,283,043 B2
(45) Date of Patent: Apr. 22, 2025

(54) TISSUE BOUNDARY DETERMINATION APPARATUS AND METHOD

(71) Applicant: GE Precision Healthcare LLC, Wauwatosa, WI (US)

(72) Inventors: Yan Sun, Beijing (CN); Xueli Wang, Beijing (CN); Mingyang Yang, Beijing (CN); Bingjie Zhao, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 386 days.

(21) Appl. No.: 17/750,631

(22) Filed: May 23, 2022

(65) Prior Publication Data

US 2022/0383491 A1 Dec. 1, 2022

(30) Foreign Application Priority Data

May 26, 2021 (CN) .......................... 202110576883.0

(51) Int. Cl.
*G06T 7/00* (2017.01)
*G06T 7/12* (2017.01)
*G06T 7/174* (2017.01)

(52) U.S. Cl.
CPC .............. *G06T 7/0012* (2013.01); *G06T 7/12* (2017.01); *G06T 7/174* (2017.01); *G06T 2207/10081* (2013.01)

(58) Field of Classification Search
CPC ......... G06T 3/4038; G06T 2207/10081; G06T 2207/20156; G06T 2207/30004; G06T 7/0012; G06T 7/11; G06T 7/12; G06T 7/174; G06T 7/187
USPC ....................................................... 382/128
See application file for complete search history.

(56) References Cited

U.S. PATENT DOCUMENTS

2014/0336504 A1* 11/2014 Zhang ................... A61B 6/505
600/425
2017/0178285 A1* 6/2017 Jiang ........................ G06T 7/12

* cited by examiner

*Primary Examiner* — Ajibola A Akinyemi (57) ABSTRACT

Embodiments of the present application provide a tissue boundary determination apparatus and method. The tissue boundary determination method includes acquiring multiple slice images of multiple positions of a tissue to be examined, determining, with regard to at least one first selected slice image of the multiple slice images, a tissue boundary on the first selected slice image, and determining, according to the tissue boundary on the first selected slice image, tissue boundaries on a predetermined number of other slice images adjacent to the first selected slice image. Therefore, an accurate tissue (such as malignant tumor) boundary may be acquired efficiently so as to provide a reference basis for analysis on internal and external tissue of a tumor.

14 Claims, 7 Drawing Sheets

TISSUE BOUNDARY DETERMINATION APPARATUS AND METHOD

CROSS-REFERENCE TO RELATED APPLICATIONS

This application claims priority to Chinese Patent Application No. 202110576883.0, filed on May 26, 2021, the disclosure of which is incorporated herein by reference in its entirety.

TECHNICAL FIELD

Embodiments of the present application relate to the technical field of medical devices, in particular to a tissue boundary determination apparatus and method for a medical imaging system.

BACKGROUND

In the field of radiation therapy or radiology, a doctor may want to find a boundary of a tissue (such as a malignant tumor) so as to formulate a radiation treatment scheme. On the one hand, the doctor needs to find a boundary of a tumor so as to accurately configure a target for a high-energy ray. On the other hand, during radiation therapy, the doctor also needs to find certain regular tissue boundaries to be avoided in configuring a direction of the high-energy ray.

It should be noted that the above background introduction is only for the purpose of clearly and completely describing the technical solutions of the present application and facilitating an understanding by a person skilled in the art.

SUMMARY

However, the inventors have discovered that, in most cases, certain contrast agents are used to highlight tumor tissue and a boundary thereof. However, depending on specific situations, even for the same patient, at different stages of treatment, a doctor cannot control the amount of contrast agent entering a tumor. Therefore, due to addition of the contrast agent, the doctor cannot accurately evaluate a treatment effect according to a treatment scheme. Therefore, doctors may hope to find tumors without needing to use a contrast agent. However, when no contrast agent is used, the doctor may have great difficulty in examining a tumor by means of a conventional multi-energy imaging technique.

On the other hand, computed tomography (CT) spectral imaging may allow the doctor to gain tissue examination capabilities. However, spectral imaging results in a large number of images, and this undoubtedly increases processing load and reduces operation efficiency. Therefore, doctors may hope to increase operation efficiency and even use imaging without a contrast agent so as to track and adjust a treatment scheme.

On the other hand, even when spectral imaging is used, conventional algorithms and emerging artificial intelligence (AI) technologies are also unable to process a tumor boundary well. The reasons are as follows: on the one hand, a tumor, especially a malignant tumor, often has an unclear boundary; and on the other hand, behavior of the tumor is variable and irregular, and even AI training cannot process the tumor well.

Regarding at least one of the above technical problems, embodiments of the present application provide a tissue boundary determination apparatus and method. It is expected that, an accurate tissue (especially malignant tumor) boundary may be acquired efficiently so as to further provide a reference for analysis on internal and external tissue of a tumor.

According to an aspect of the embodiments of the present application, a tissue boundary determination apparatus is provided. The apparatus includes an image acquisition unit, used to acquire multiple slice images of multiple positions of a tissue to be examined, a first boundary determination unit, used to determine, with regard to at least one first selected slice image of the multiple slice images, a tissue boundary on the first selected slice image, and a second boundary determination unit, used to determine, according to the tissue boundary on the first selected slice image, tissue boundaries on a predetermined number of other slice images adjacent to the first selected slice image.

In some embodiments, the apparatus further includes a third boundary determination unit, used to determine, with regard to at least one second selected slice image of the multiple slice images, a tissue boundary on the second selected slice image, and a fourth boundary determination unit, used to determine, according to the tissue boundary on the second selected slice image, tissue boundaries on a predetermined number of other slice images adjacent to the second selected slice image, wherein a selection order of the at least one second selected slice image is opposite to a selection order of the at least one first selected slice image.

In some embodiments, the multiple slice images are spectral images acquired by performing CT scanning on the multiple positions of the tissue to be examined, and the determination of a tissue boundary on a selected slice image includes performing feature extraction on each pixel on a selected slice image to acquire features of all pixels on the selected slice image, initializing a seed point on the selected slice image, and performing, on the selected slice image, according to the features of all of the pixels on the selected slice image and a pre-configured region expansion criterion, region expansion on the seed point to acquire a tissue boundary on the selected slice image.

In some embodiments, the performance of feature extraction on each pixel on a selected slice image includes calculating a slope of a spectral curve corresponding to the pixel and a mean value of CT values of two points on the spectral curve corresponding to the pixel, and using the slope of the spectral curve and the mean value of the CT values as a feature of the pixel.

In some embodiments, the performance of feature extraction on each pixel on a selected slice image includes calculating an effective area of a spectral curve corresponding to the pixel and a mean value of CT values of two points on the spectral curve corresponding to the pixel, and using the effective area of the spectral curve and the mean value of the CT values as a feature of the pixel.

In some embodiments, the initialization of a seed point on the slice image includes acquiring a position obtained by means of an input operation performed by an operator on the slice image, and using a pixel in the position as the seed point.

In some embodiments, the performance, on the selected slice image, of region expansion on the seed point includes acquiring a feature of a boundary pixel of a position where the seed point is located and features of adjacent pixels adjacent to the boundary pixel, comparing the feature of the boundary pixel with the features of the adjacent pixels, and using an adjacent pixel having a feature difference within a predetermined range as an expansion region of the seed point, and determining whether the pre-configured region expansion criterion is satisfied, if so, then using the expansion region as a tissue boundary on the selected slice image, and otherwise, continuing performing region expansion on the expansion region until the pre-configured region expansion criterion is satisfied.

In some embodiments, the determination of tissue boundaries on a predetermined number of other slice images adjacent to a selected slice image includes copying a tissue boundary on a selected slice image to a slice image adjacent to the selected slice image, shrinking the tissue boundary on the adjacent slice image, and using the shrunk tissue boundary as a basis and performing, on the adjacent slice image, according to features of all pixels on the adjacent slice image and a pre-configured region expansion criterion, region expansion on the shrunk tissue boundary to form a final tissue boundary on the adjacent slice image.

According to another aspect of the embodiments of the present application, a tissue boundary determination method is provided, the method including, acquiring multiple slice images of multiple positions of a tissue to be examined, determining, with regard to at least one first selected slice image of the multiple slice images, a tissue boundary on the first selected slice image, and determining, according to the tissue boundary on the first selected slice image, tissue boundaries on a predetermined number of other slice images adjacent to the first selected slice image.

According to another aspect of the embodiments of the present application, an electronic device is provided, and comprises a memory and a processor, the memory storing a computer program, and the processor being configured to execute the computer program so as to implement the aforementioned tissue boundary determination method.

One of the beneficial effects of the embodiments of the present application is as follows: according to the embodiments of the present application, an accurate tissue boundary can be acquired efficiently so as to further provide a reference for analysis on internal and external tissue of a tumor.

Referring to the description and drawings below, specific implementations of the embodiments of the present application are disclosed in detail, indicating the method in which the principle of the embodiments of the present application may be employed. It should be understood that the implementations of the present application are not hereby limited in scope. Within the scope of the spirit and terms of the appended claims, the implementations of the present application comprise many changes, modifications, and equivalents.

BRIEF DESCRIPTION OF THE DRAWINGS

The drawings included herein are used to provide a further understanding of the embodiments of the present application, constituting a portion of the description, and are used for illustrating the implementations of the present application and explaining the principle of the present application together with textual description. Apparently, the drawings in the following description are merely some embodiments of the present application, and those of ordinary skill in the art can obtain other implementations according to these drawings without the exercise of inventive effort. In the drawings.

DETAILED DESCRIPTION

Referring to the drawings, the foregoing and other features of the embodiments of the present application will become apparent due to the following description. In the description and the drawings, specific implementations of the present application are specifically disclosed, indicating some implementations that can employ the principles of the embodiments of the present application. It should be understood that the present application is not limited to the embodiments described, and rather, the embodiments of the present application include all modifications, variations, and equivalents within the scope of the appended claims.

In the embodiments of the present application, the terms "first," "second," etc. are used to distinguish different elements, but do not represent a spatial arrangement or temporal order etc. of these elements, and these elements should not be limited by these terms. The terms "and/or" and "/" include any one of and all combinations of one or more of the associated listed terms. The terms "comprise," "include," "have," etc. refer to the presence of described features, elements, components, or assemblies, but do not exclude the presence or addition of one or more other features, elements, components, or assemblies.

In the embodiments of the present application, the singular forms "a," "the," etc. include plural forms, and should be broadly construed as "a type of" or "a class of" rather than limited to the meaning of "one." Furthermore, the term "said" should be construed as including both the singular and plural forms, unless otherwise specified in the context. In addition, the term "according to" should be construed as "at least in part according to . . . ," and the term "based on" should be construed as "at least in part based on . . . ," unless otherwise specified in the context.

The features described and/or illustrated for one implementation may be used in one or more other implementations in the same or similar manner, combined with features in other implementations, or replace features in other implementations. The term "include/comprise" when used herein refers to the presence of features, integrated components, steps, or assemblies, but does not preclude the presence or addition of one or more other features, integrated components, steps, or assemblies.

The apparatus for acquiring medical image data described herein can be applied to various medical imaging modalities, including but not limited to a computed tomography (CT)

device, a magnetic resonance imaging (MM) device, a C-arm imaging device, a positron emission computed tomography (PET) device, a single photon emission computed tomography scanning (SPECT) device, or any other appropriate medical imaging device.

A system for acquiring medical image data may include the aforementioned medical imaging device, may also include a separate computer device connected to the medical imaging device, and may further include a computer device connected to the Internet cloud. The computer device is connected via the Internet to a medical imaging device or a memory for storing medical images. An imaging method may be independently or jointly implemented by the aforementioned medical imaging device, the computer device connected to the medical imaging device, and the computer device connected to the Internet cloud.

Exemplarily, the embodiments of the present application are described below in conjunction with an X-ray computed tomography (CT) device. Those skilled in the art could understand that the embodiments of the present application can also be applied to other medical imaging devices.

Figure 1:
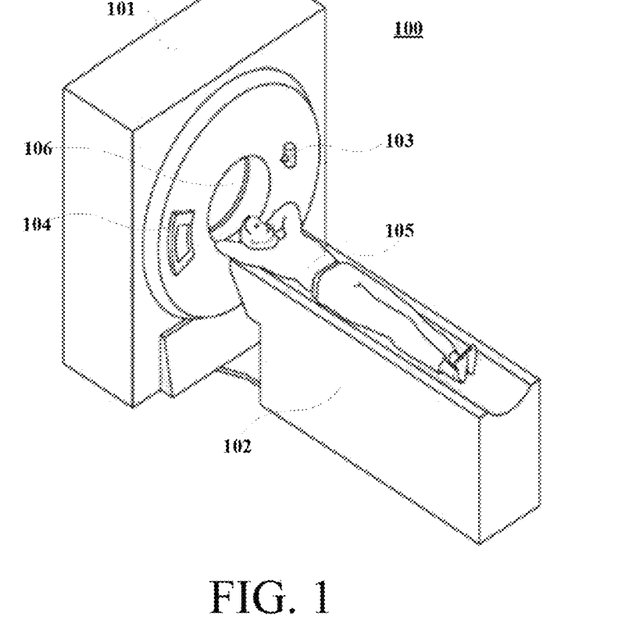
FIG. 1 is a schematic diagram of a CT imaging device according to an embodiment of the present application.

FIG. 1 is a schematic diagram of a CT imaging device according to an embodiment of the present application, schematically illustrating the case of a CT imaging device 100. As shown in FIG. 1, the CT imaging device 100 includes a gantry 101 and a patient table 102. The gantry 101 has an X-ray source 103, and the X-ray source 103 projects an X-ray beam towards a detector assembly or a collimator 104 on an opposite side of the gantry 101. A test object 105 can lie flat on the patient table 102 and be moved into a gantry opening 106 along with the patient table 102. Medical image data of the test object 105 can be acquired by means of a scan carried out by the X-ray source 103.

Figure 2:
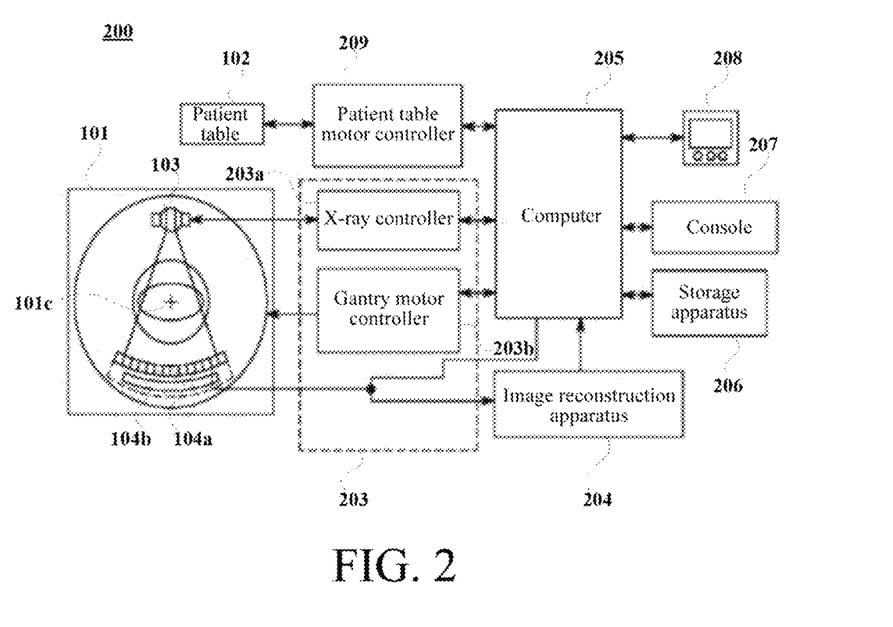
FIG. 2 is a schematic diagram of a CT imaging system according to an embodiment of the present application.

FIG. 2 is a schematic diagram of a CT imaging system according to an embodiment of the present application, schematically illustrating a block diagram of a CT imaging system 200. As shown in FIG. 2, the detector assembly 104 includes a plurality of detector units 104a and a data acquisition system (DAS) 104b. The plurality of detector units 104a sense the projected X-ray passing through the test object 105.

The DAS 104b converts, according to the sensing of the detector units 104a, collected information into projection data for subsequent processing. During the scan in which the X-ray projection data is acquired, the gantry 101 and components mounted thereon rotate about a rotation center 101c.

The rotation of the gantry 101 and the operation of the X-ray source 103 are controlled by a control mechanism 203 of the CT imaging system 200. The control mechanism 203 includes an X-ray controller 203a for providing power and a timing signal to the X-ray source 103, and a gantry motor controller 203b for controlling the rotation speed and position of the gantry 101. An image reconstruction apparatus 204 receives the projection data from the DAS 104b and performs image reconstruction. A reconstructed image is transmitted as an input to a computer 205, and the computer 205 stores the image in a mass storage apparatus 206.

The computer 205 further receives an instruction and scan parameters from an operator through a console 207. The console 207 has a form of operator interface, such as a keyboard, a mouse, a voice-activated controller, or any other appropriate input device. An associated display 208 allows the operator to observe the reconstructed image and other data from the computer 205. The instruction and parameters provided by the operator are used by the computer 205 to provide control signals and information to the DAS 104b, the X-ray controller 203a, and the gantry motor controller 203b. Additionally, the computer 205 operates a patient table motor controller 209 used to control the patient table 102 so as to position the test object 105 and the gantry 101. In particular, the patient table 102 moves the test object 105 in whole or in part to pass through the gantry opening 106 of FIG. 1.

The device and system for acquiring medical image data (which may also be referred to as medical images or medical image data) according to the embodiments of the present application are schematically described above, but the present application is not limited thereto. The medical imaging device may be a CT device, an MRI device, a PET device, a SPECT device, or any other appropriate imaging device. A storage device may be located within the medical imaging device, in a server external to the medical imaging device, in an independent medical image storage system (such as a picture archiving and communication system (PACS)), and/or in a remote cloud storage system.

Moreover, a medical imaging workstation can be disposed locally in the medical imaging device, that is, the medical imaging workstation is disposed adjacent to the medical imaging device, and both of them can be located in a scan room, an imaging department, or the same hospital. A medical image cloud platform analysis system may be located far away from the medical imaging device. For example, the medical image cloud platform analysis system can be disposed in a cloud terminal communicating with the medical imaging device.

As an example, after a medical institution completes an imaging scan using the medical imaging device, scan data is stored in the storage device. The medical imaging workstation may directly read the scan data and perform image processing by means of a processor thereof. As another example, the medical image cloud platform analysis system may read a medical image in the storage device by means of remote communication to provide "software as a service (SAAS)." SAAS can exist between hospitals, between a hospital and an imaging center, or between a hospital and a third-party online diagnosis and treatment service provider.

The medical image scanning device and system is schematically illustrated above, and the embodiments of the present application are described in detail below with reference to the accompanying drawings.

Figure 3:
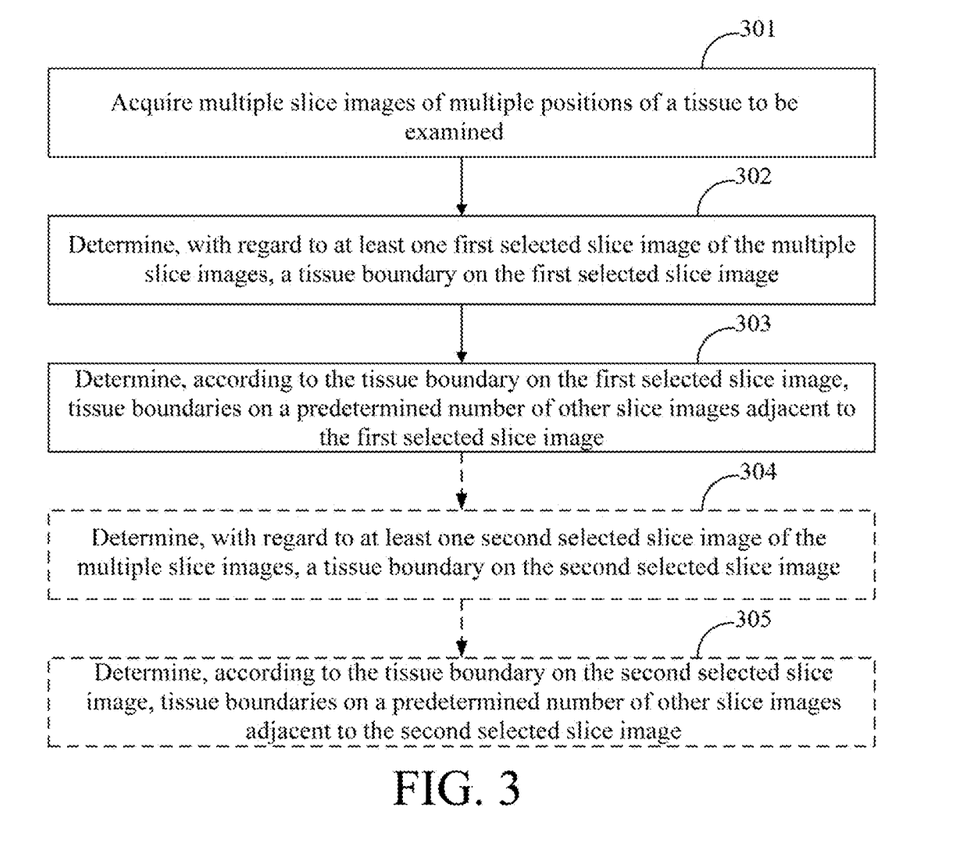
FIG. 3 is a schematic diagram of a tissue boundary determination method according to an embodiment of the present application.

A first embodiment of the present application provides a tissue boundary determination method. FIG. 3 is a schematic diagram of a tissue boundary determination method according to an embodiment of the present application. As shown in FIG. 3, the method includes step 301, acquiring multiple slice images of multiple positions of a tissue to be examined, step 302, determining, with regard to at least one first selected slice image of the multiple slice images, a tissue boundary on the first selected slice image, and step 303, determining, according to the tissue boundary on the first selected slice image, tissue boundaries on a predetermined number of other slice images adjacent to the first selected slice image.

It should be noted that FIG. 3 only schematically illustrates this embodiment of the present application, but the present application is not limited thereto. For example, the execution order of the operations may be adjusted appropriately. In addition, some other operations may be added, or some of the operations may be skipped. Those skilled in the art could make appropriate variations according to the above content, and the present application is not limited to the description of FIG. 3.

The inventors have found that by using CT scanning technologies such as dual-energy CT scanning, multi-energy CT scanning, or photon imaging technology, attenuation of each pixel at different keV levels can be acquired and therefore a spectral curve of the pixels can be constructed.

Figure 4:
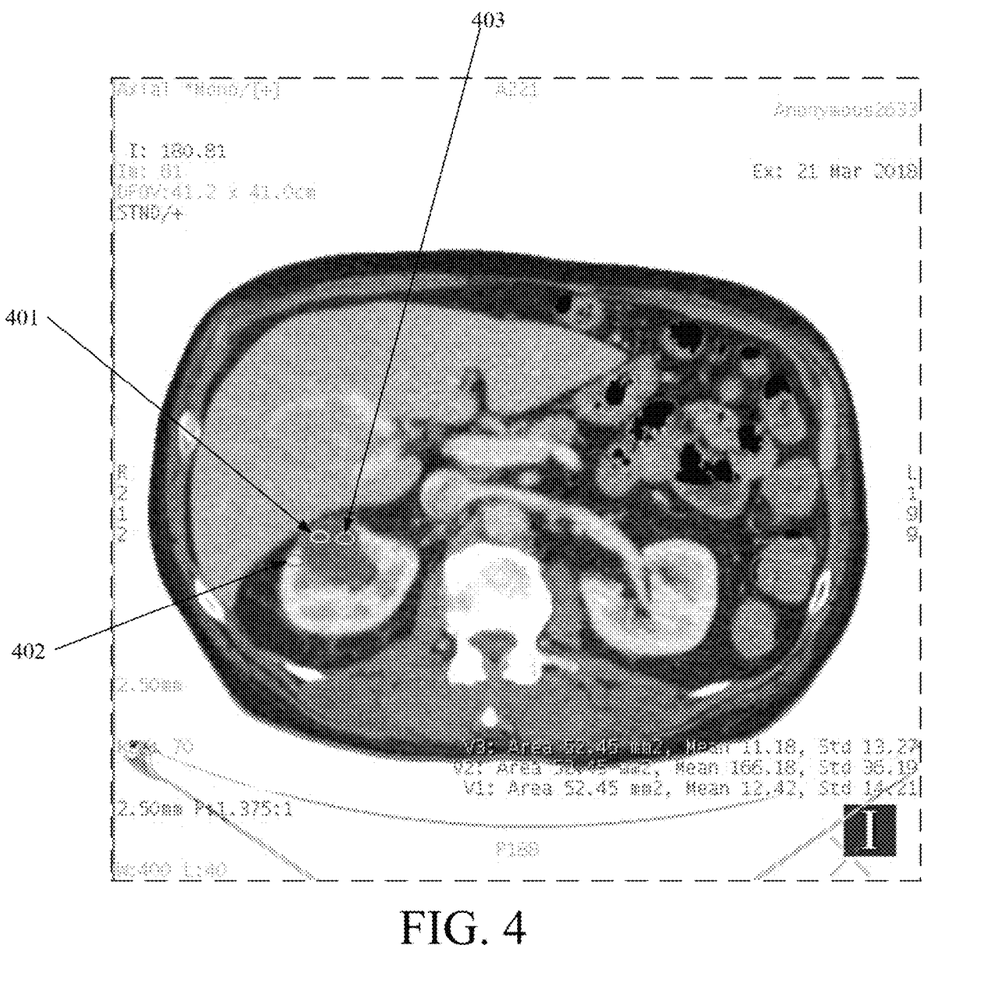
FIG. 4 is a schematic diagram of a slice image.
Figure 5:
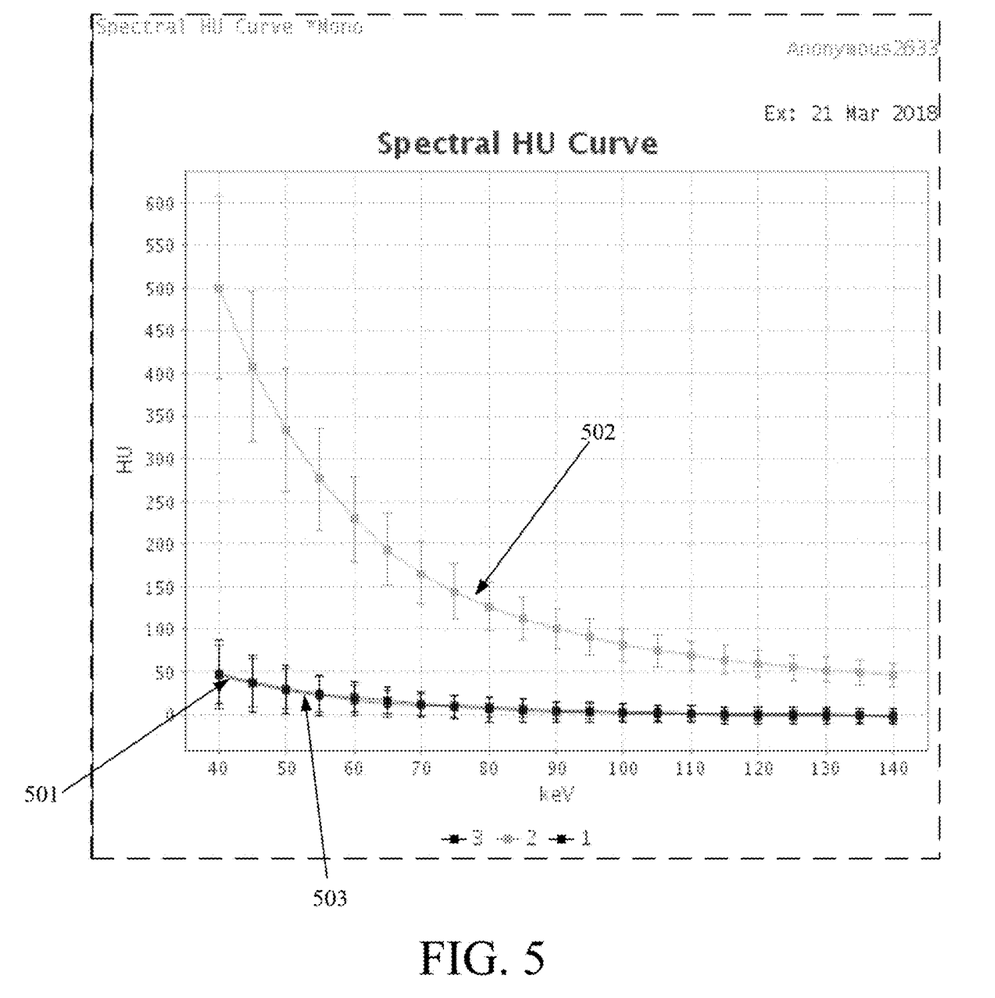
FIG. 5 is a schematic diagram of a spectral curve of three pixels on a slice image shown in FIG. 4.

FIG. 4 is a schematic diagram of a slice image, and FIG. 5 is a schematic diagram of a spectral curve of points 401-403 on the slice image shown in FIG. 4. As shown in FIG. 4 and FIG. 5, the point 402 corresponding to a curve 502 is in a tumor region, and the point 401 corresponding to a curve 501 and the point 403 corresponding to a curve 503 are both in a regular region. It can be seen that it is easier to distinguish between a tumor region and regular tissue by means of spectral information.

In the embodiments of the present application, the aforementioned multiple slice images are acquired from spectral images of the multiple positions (cross sections) of the tissue to be examined. Tissue boundaries on a part of the multiple slice images are determined, and tissue boundaries on the other slice images are determined according to the tissue boundaries on these slice images, thereby reducing a computation load, quickly outlining a region of interest with regard to a user, and providing a reference and basis for analysis on internal and external tissue of a tumor.

In the embodiments of the present application, in 301, the tissue to be examined is, for example, tumor tissue. The present application is not limited thereto, and the tissue to be examined may also be other tissue depending on a type of examination performed by a doctor. In 301, the multiple slice images refer to slice images of multiple positions of the tissue to be examined.

In the above embodiment, by performing CT scanning on multiple positions (multiple cross sections) of the tissue to be examined, two spectral images of each position can be acquired, the two spectral images being kVp images. By further processing the two spectral images, multiple slice images of this position can be acquired, the multiple slice images being keV images. Therefore, a spectral curve of each pixel in this position can be acquired. The present application does not limit the CT scanning method. As described above, the CT scanning method may be dual-energy CT scanning, multi-energy CT scanning, or photon imaging CT scanning, etc. In addition, the present application also does not limit energy used for CT scanning.

Dual-energy CT scanning is used as an example. For example, dual-energy CT scanning may be performed by means of a 80 kVp energy and a 140 kVp energy, and dual-energy CT scanning may also be performed by means of another combination of two energies as long as a certain difference exists between respective values of the two energies.

In addition, the present application also does not limit the method for acquiring multiple slice images from the acquired two spectral images, and reference may be made to related technologies.

FIG. 4 and FIG. 5 are used as an example. In this example, CT scanning is performed on one position of the tissue to be examined so as to acquire 140−40+1=101 slice images. If it is assumed that CT scanning is separately performed on 200 positions of the tissue to be examined, that the aforementioned 101 slice images are acquired from each position, and that one slice image is selected from each position and is used as a slice image corresponding to the position, then 200 slice images of 200 positions are acquired.

In the above embodiment, depending on a part where the tissue to be examined is located and/or a size of the tissue to be examined, the number of positions to be subjected to CT scanning is not limited. For example, for tissue to be examined having a small volume, 200 cross sections may be selected and CT scanning is performed thereon so as to acquire 200 slice images. For tissue to be examined having a large volume, 500 or more cross sections may be selected and CT scanning is performed thereon so as to acquire 500 or more slice images.

In the embodiments of the present application, in 302, only a part of the multiple slice images are selected to determine a tissue boundary. For example, according to an acquisition order (this may be a temporal order, and may also be an arrangement order of positions corresponding to all slice images) of the multiple slice images, one slice image is selected from every certain number of slice images so as to determine the tissue boundary.

For example, if 200 slice images of 200 positions are acquired, and one slice image may be selected from every nine slice images. The selected slice image is used as the first selected slice image, and tissue boundary determination is performed thereon. For example, the 1st slice image, the 11th slice image, the 21st slice image, etc. are used as the first selected slice image, and tissue boundary determination is performed only on the 1st slice image, the 11th slice image, the 21st slice image, etc.

Figure 6:
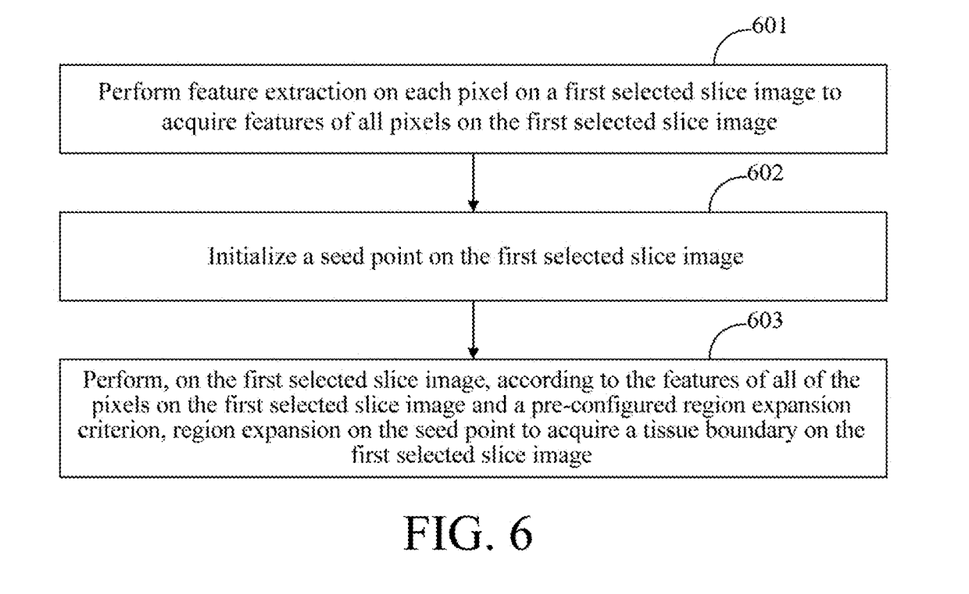
FIG. 6 is a schematic diagram of an example of determining a tissue boundary on a first selected slice image.

In 302, the determination of a tissue boundary on the first selected slice image may be implemented by the method of FIG. 6. As shown in FIG. 6, the method includes, step 601, performing feature extraction on each pixel on the first selected slice image to acquire features of all pixels on the first selected slice image, step 602, initializing a seed point on the first selected slice image, and step 603, performing, on the first selected slice image, according to the features of all of the pixels on the first selected slice image and a pre-configured region expansion criterion, region expansion on the seed point to acquire the tissue boundary on the first selected slice image.

In the above embodiment, since the multiple slice images are spectral images acquired by performing CT scanning on the multiple positions of the tissue to be examined, by extracting the features of the pixels on the slice image, more spectral information may be acquired, and therefore a more accurate tissue boundary can be acquired.

In 601, in some embodiments, with regard to each pixel on the first selected slice image, a slope of a spectral curve corresponding to the pixel and a mean value of CT values of two points on the spectral curve corresponding to the pixel may be calculated, and the slope of the energy spectrum curve and the mean value of the CT values may be used as a feature of the pixel. For example, the slope of the spectral curve of the pixel may be calculated by means of the following formula (1):

$$f_{slope} = \frac{HU_{kev_{high}} - HU_{kev_{low}}}{kev_{high} - kev_{low}} \quad (1)$$

In the above formula (1), $kev_{high}$ is the highest keV of the spectral curve of the pixel, $kev_{low}$ is the lowest keV of the spectral curve of the pixel, $HU_{kev_{high}}$ is a CT value corresponding to the highest keV of the spectral curve of the pixel, and $HU_{kev_{low}}$ is a CT value corresponding to the lowest keV of the spectral curve.

For example, the mean value of the CT values of two points on the spectral curve of the pixel may be calculated by means of the following formula (2):

$$f_{ct\_mean} = (HU_{kev1} + HU_{kev2})/2 \quad (2)$$

In the above formula (2), $HU_{kev1}$ is a CT value corresponding to a certain point on the spectral curve of the pixel, and $HU_{kev2}$ is a CT value corresponding to another point on the spectral curve of the pixel.

In 601, in some embodiments, an effective area of the spectral curve may be used instead of the aforementioned slope of the spectral curve. That is, with regard to each pixel on the first selected slice image, an effective area of the spectral curve corresponding to the pixel and a mean value of CT values of two points on the spectral curve corresponding to the pixel may be calculated, and the effective area of the spectral curve and the mean value of the CT values may be used as a feature of the pixel.

For example, the effective area of the spectral curve corresponding to the pixel may be calculated by means of the following formula (3):

$$f_{integration} = \sum_{n=minkev}^{n=maxkev} \left( \frac{HU_n + HU_{n+1}}{2} - HU_{maxkev} \right) \quad (3)$$

Figure 7:
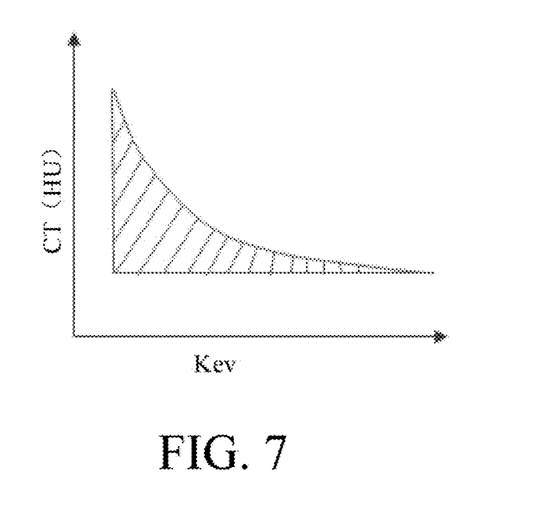
FIG. 7 is a schematic diagram of an example of an effective area of a spectral curve.

In the above formula (3), $HU_{maxkev}$ is a CT value corresponding to the maximum keV on the spectral curve, and $HU_n$ and $HU_{n+1}$ are CT values respectively corresponding to two points on the spectral curve. The shading of FIG. 7 shows the effective area of the spectral curve.

In the above embodiment, the case in which the slope/effective area of the spectral curve and the mean value of the CT values are calculated according to a point having the highest keV and a point having the lowest keV on the spectral curve corresponding to the pixel is used as an example. However, the present application is not limited thereto, and the slope/effective area of the spectral curve and the mean value of the CT values may also be calculated according to another two points on the spectral curve as long as a gap of a certain keV exists between the two points. The present application also does not limit the keV gap therebetween.

In the above embodiment, only the case in which the slope/effective area of the spectral curve of the pixel and the mean value of the CT values are used as the feature of the pixel is used as an example. However, the present application is not limited thereto, and extensions may be made on this basis. For example, the other features of the spectral curve of the pixel are used as the feature of the pixel, so that region expansion is performed on the seed point in 603 so as to acquire the tissue boundary on the first selected slice image.

In 602, the seed point is a point initially determined by an operator (such as the doctor) to be tissue (such as a tumor). In some embodiments, a position acquired by means of an input operation performed by the operator on the first selected slice image may be acquired, and a pixel in the position may be used as the seed point on the first selected slice image.

The present application does not limit a type of the input operation. The input operation may be a line drawing operation, may also be a point drawing operation, may also be a polygon drawing operation or an irregular figure drawing operation, and so on. The line drawing operation may be to draw a straight line, may also be to draw a curve, may be to draw a single line, and may also be to draw multiple lines. The present application is not limited thereto.

By means of the input operation, an initialized seed point, namely the point initially determined by the operator to be tissue (such as a tumor), can be acquired.

Figure 8:
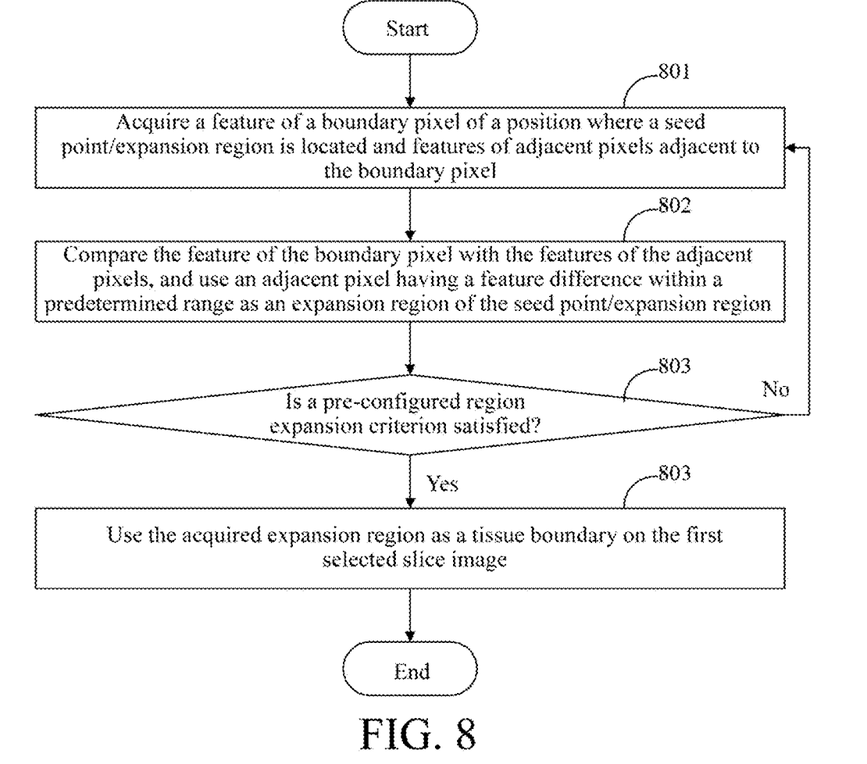
FIG. 8 is a schematic diagram of an example of performing region expansion on a seed point.

In 603, in some embodiments, the performance, on the first selected slice image, of region expansion on the seed point may be implemented by the method of FIG. 8. As shown in FIG. 8, the method includes step 801, acquiring a feature of a boundary pixel of a position where the seed point is located and features of adjacent pixels adjacent to the boundary pixel, step 802, comparing the feature of the boundary pixel with the features of the adjacent pixels, and using an adjacent pixel having a feature difference within a predetermined range as an expansion region of the seed point, and step 803, determining whether the pre-configured region expansion criterion is satisfied, if so, then using the expansion region of the seed point as the tissue boundary on the selected slice image, and otherwise, continuing performing region expansion on the expansion region of the seed point until the pre-configured region expansion criterion is satisfied.

In the above embodiment, the features of all of the pixels on the first selected slice image are acquired in 601. Therefore, in 801, a feature of a boundary pixel of a position where the seed point is located and features of adjacent pixels adjacent to the boundary pixel can be acquired. In addition, the case in which the acquired features are the slope/effective area and the mean value of the CT values is used as an example. In 802, the comparison between the features may be comparison between slopes/effective areas and comparison between mean values of the CT values.

For example, with regard to each boundary pixel a, features, namely slopes/effective areas and mean values of CT values, are calculated with regard to multiple pixels a1, a2, . . . adjacent thereto. If a difference between a slope or an area of pixel a1 and a slope or an area of pixel a is less than a pre-configured first threshold (that is, the difference is within a predetermined range), and if a difference between respective mean values of CT values of the two pixels is less than a pre-configured second threshold (that is, the difference is within a predetermined range), then it is considered that pixel a1 and pixel a belong to the same material, and pixel a1 is classified into a region of pixel a. If a difference between pixel a2 and pixel a is greater than the threshold (a difference between slopes or areas is greater than the first threshold, and a difference between mean values of CT values is greater than the second threshold), then it is considered that pixel a2 does not belong to the region of pixel a. The present application does not limit respective values of the first threshold and the second threshold, and the two may be configured according to experience.

In the above embodiment, in 803, the method for performing region expansion on the expansion region of the seed point is the same as the method for performing region expansion on the seed point, and the difference is only in that the position where the seed point is located needs to be replaced with the expansion region of the seed point in 801. For example, a feature of a boundary pixel of a position where the expansion region of the seed point is located and features of adjacent pixels adjacent to the boundary pixel are acquired, the feature of the boundary pixel is compared with the features of the adjacent pixels, and an adjacent pixel having a feature difference within a predetermined range is used as an expansion region of the expansion region of the seed point. And so on.

In the above embodiment, the boundary pixel of the position where the seed point/expansion region is located refers to a pixel close to a boundary among pixels of the position where the seed point/expansion region is located. If the case in which the seed point is a line is used as an example, then the boundary pixel of the position where the seed point is located refers to all pixels of the position where this line is located because all pixels of this line belong to a boundary. If the case in which the seed point or the expansion region is a polygon is used as an example, then the boundary pixel of the position where the seed point/expansion region is located is a pixel located on an edge of a region of the polygon among pixels of a position where the region of the polygon is located.

In the above embodiment, the region expansion criterion refers to an expansion condition and an ending condition for performing region expansion. The present application does not limit the region expansion criterion. For details, reference may be made to related technologies, and the description is omitted herein.

In 603, by performing region expansion on the seed point, the tissue boundary on the first selected slice image is acquired.

In the embodiments of the present application, in 303, after the tissue boundary on the first selected slice image is acquired, tissue boundaries on a predetermined number of other slice images adjacent to the first selected slice image can be determined according to this tissue boundary. For example, on the basis that positions and features of adjacent slice images are similar, a method employing a level set is used to iteratively split all slice images of the tissue to be examined.

Continuing to use the aforementioned 200 slice images corresponding to 200 positions (cross sections) of the tissue to be examined as an example: if it is assumed that the 1st slice image, the 11th slice image, the 21st slice image, the 31st slice image, the 41st slice image, etc. are used as the first selected slice image, and after tissue boundaries on the 1st slice image, the 11th slice image, the 21st slice image, the 31st slice image, the 41st slice image, etc. are acquired according to the method of FIG. 5, then tissue boundaries on the 2nd-10th slice images, 12th-20th slice images, 22nd-30th slice images, 32nd-40th slice images, etc. can be determined according to the tissue boundaries on the 1st slice image, the 11th slice image, the 21st slice image, the 31st slice image, the 41st slice image, etc.

Figure 9:
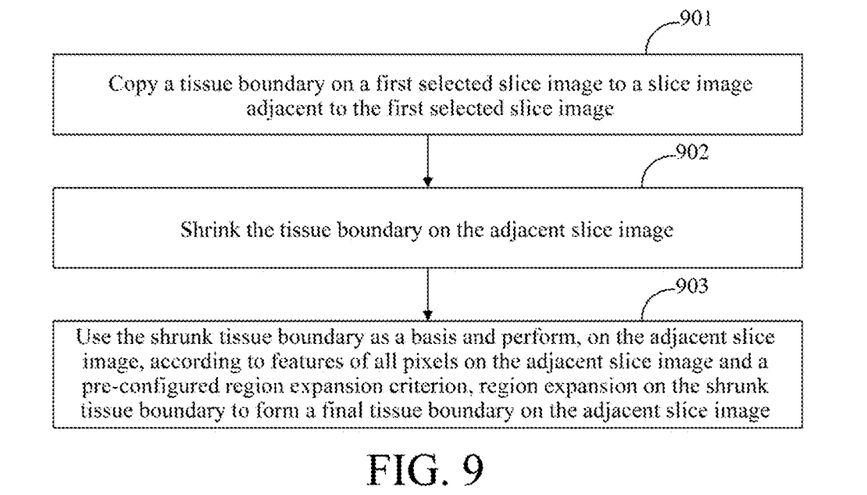
FIG. 9 is a schematic diagram of an example of determining tissue boundaries on slice images adjacent to a selected slice image.

In some embodiments, the determination of tissue boundaries on a predetermined number of other slice images adjacent to the first selected slice image may be implemented by the method of FIG. 9. As shown in FIG. 9, the method includes, step 901, copying a tissue boundary on the first selected slice image to a slice image adjacent to the first selected slice image, step 902, shrinking the tissue boundary on the adjacent slice image, and step 903, using the shrunk tissue boundary as a basis and performing, on the adjacent slice image, according to features of all pixels on the adjacent slice image and a pre-configured region expansion criterion, region expansion on the shrunk tissue boundary to form a final tissue boundary on the adjacent slice image.

The case in which the first selected slice image is slice 1 and the adjacent slice image is slice 2 is used as an example. The adjacency described herein may refer to temporal adjacency or positional adjacency, and this depends on an acquisition order of multiple slice images. In the embodiments of the present application, after a tissue boundary on slice 1 is acquired, the tissue boundary is copied to slice 2 and single shrinking is performed, and then the shrunk tissue boundary is used as an initial tissue boundary of slice 2. Then, outward expansion is performed from this initial tissue boundary, where the expansion method is the same as the method used to perform region expansion on the seed point. Therefore, according to the feature of each pixel and the region expansion criterion (namely the expansion condition and the ending condition), expansion is performed to form a final tissue boundary of slice 2. With regard to a tissue boundary on slice 3, a method similar to the method for slice 2 can be used. The difference is that the final tissue boundary of slice 2 is copied to slice 3, etc.

In the above embodiment, the adjacent slice image may be a slice image before a current slice image, and may also be a slice image after the current slice image. The present application is not limited thereto. For example, a tissue boundary of slice 11 may be determined according to a tissue boundary of slice 10, or the tissue boundary of slice 11 may be determined according to a tissue boundary of slice 12.

In the embodiments of the present application, in some embodiments, as shown in FIG. 3, the method further includes, step 304, determining, with regard to at least one second selected slice image of the multiple slice images, a tissue boundary on the second selected slice image, and step 305, determining, according to the tissue boundary on the second selected slice image, tissue boundaries on a predetermined number of other slice images adjacent to the second selected slice image, wherein a selection order of the at least one second selected slice image is opposite to a selection order of the at least one first selected slice image.

In the embodiments of the present application, tissue boundaries on multiple slice images can be acquired according to 302 and 303. However, in certain slice images, the tissue to be examined has more than one region. In order to avoid omission of a certain region or certain regions, in the present application, tissue boundary determination processing is performed again in an opposite direction on the multiple slice images. That is, tissue boundary determination processing is performed on the slice images, starting from the last slice image and ending at the first slice image. Therefore, the tissue boundary on the slice image is determined by a bidirectional traversal method, thereby further improving the accuracy of splitting of the tissue boundary.

In the above embodiment, the selection order of the second selected slice image being opposite to the selection order of the first selected slice image refers to the following: if the selection order of the first selected slice image is an acquisition order of the above multiple slice images, then the selection order of the second selected slice image is a reverse order relative to the acquisition order of the multiple slice images.

If the acquisition order of the multiple slice images is slice 1, slice 2, slice 3, slice 4, . . . , slice 200, then if the selection order of the first selected slice image is slice 1, slice 11, slice 21, etc., the selection order of the second selected slice image is slice 200, slice 190, slice 180, slice 170, etc. The above is merely an example, and the present application is not limited thereto. In addition, the number of slice images between the at least one first selected slice image and the at least one second selected slice image may be the same or may be different.

Figure 10:
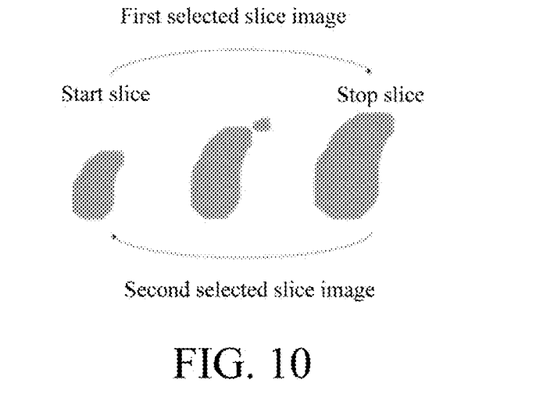
FIG. 10 is a schematic diagram of an example of respective selection orders of a first selected slice image and a second selected slice image.

FIG. 10 is an example of the selection order of the slice image. As shown in FIG. 10, if the selection order of the at least one first selected slice image is from a start slice to a stop slice, then the selection order of the at least one second selected slice image is from the stop slice to the start slice.

The method according to the above embodiment may avoid omission of regions of the tissue to be examined.

In the above embodiment, processing in 304 is the same as processing in 302. For details, reference may be made to FIG. 6. In addition, processing in 305 is the same as processing in 303. For details, reference may be made to FIG. 9, the description is omitted herein.

The above embodiments merely provide illustrative description of the embodiments of the present application. However, the present application is not limited thereto, and appropriate variations may be made on the basis of the above embodiments. For example, each of the above embodiments may be used independently, or one or more of the above embodiments may be combined.

According to the embodiments of the present application, an accurate tissue boundary can be acquired efficiently so as to further provide a reference for analysis on internal and external tissue of a tumor.

A second embodiment of the present application provides a tissue boundary determination apparatus. The content the same as that in the embodiment of the first aspect is not repeated herein.

Figure 11:
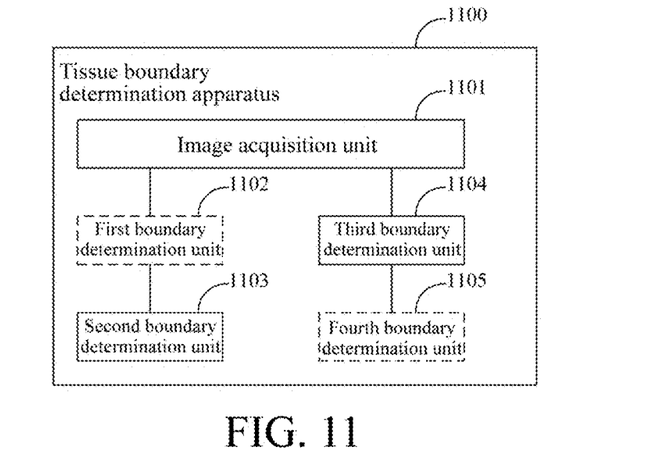
FIG. 11 is a schematic diagram of a tissue boundary determination apparatus according to an embodiment of the present application.

FIG. 11 is a schematic diagram of the tissue boundary determination apparatus according to an embodiment of the present application. As shown in FIG. 11, the tissue boundary determination apparatus 1100 includes, an image acquisition unit 1101, used to acquire multiple slice images of multiple positions of a tissue to be examined, a first boundary determination unit 1102, used to determine, with regard to at least one first selected slice image of the multiple slice images, a tissue boundary on the first selected slice image and a second boundary determination unit 1103, used to determine, according to the tissue boundary on the first selected slice image, tissue boundaries on a predetermined number of other slice images adjacent to the first selected slice image.

In some embodiments, as shown in FIG. 11, the apparatus 1100 further includes a third boundary determination unit 1104, used to determine, with regard to at least one second selected slice image of the multiple slice images, a tissue boundary on the second selected slice image, and a fourth boundary determination unit 1105, used to determine, according to the tissue boundary on the second selected slice image, tissue boundaries on a predetermined number of other slice images adjacent to the second selected slice image.

A selection order of the at least one second selected slice image is opposite to a selection order of the at least one first selected slice image.

In some embodiments, the multiple slice images are spectral images acquired by performing CT scanning on the multiple positions of the tissue to be examined, and the first boundary determination unit 1102/third boundary determination unit 1104 determining a tissue boundary on a selected slice image (the first selected slice image/the second selected slice image) includes performing feature extraction on each pixel on a selected slice image to acquire features of all pixels on the selected slice image, initializing a seed point on the selected slice image, and performing, on the selected slice image, according to the features of all of the pixels on the selected slice image and a pre-configured region expansion criterion, region expansion on the seed point to acquire a tissue boundary on the selected slice image.

In the above embodiments, in some embodiments, the performance of feature extraction on each pixel on a selected slice image includes calculating a slope of a spectral curve corresponding to the pixel and a mean value of CT values of two points on the spectral curve corresponding to the pixel, and using the slope of the spectral curve and the mean value of the CT values as a feature of the pixel.

In the above embodiments, in some embodiments, the performance of feature extraction on each pixel on a selected slice image includes calculating an effective area of a spectral curve corresponding to the pixel and a mean value of CT values of two points on the spectral curve corresponding to the pixel, and using the effective area of the spectral curve and the mean value of the CT values as a feature of the pixel.

In the above embodiments, in some embodiments, the initialization of a seed point on the slice image includes acquiring a position obtained by means of an input operation performed by an operator on the slice image, and using a pixel in the position as the seed point.

In the above embodiments, in some embodiments, the performance, on the selected slice image, of region expansion on the seed point includes acquiring a feature of a boundary pixel of a position where the seed point is located and features of adjacent pixels adjacent to the boundary pixel, comparing the feature of the boundary pixel with the features of the adjacent pixels, and using an adjacent pixel having a feature difference within a predetermined range as an expansion region of the seed point, and determining whether the pre-configured region expansion criterion is satisfied, if so, then using the expansion region as a tissue boundary on the selected slice image, and otherwise, continuing performing region expansion on the expansion region until the pre-configured region expansion criterion is satisfied.

In some embodiments, the second boundary determination unit 1103/fourth boundary determination unit 1105 determining tissue boundaries on a predetermined number of other slice images adjacent to a selected slice image (the first selected slice image/the second selected slice image) includes copying a tissue boundary on a selected slice image to a slice image adjacent to the selected slice image, shrinking the tissue boundary on the adjacent slice image, and using the shrunk tissue boundary as a basis and performing, on the adjacent slice image, according to features of all pixels on the adjacent slice image and a pre-configured region expansion criterion, region expansion on the shrunk tissue boundary to form a final tissue boundary on the adjacent slice image.

For the sake of simplicity, FIG. 11 only exemplarily illustrates a connection relationship or signal direction between various components or modules, but it should be clear to those skilled in the art that various related technologies such as bus connection can be used. The above components or modules can be implemented by hardware facilities such as a processor and a memory, and there are no restrictions thereto in the embodiments of the present application.

The above embodiments merely provide illustrative description of the embodiments of the present application. However, the present application is not limited thereto, and appropriate variations may be made on the basis of the above embodiments. For example, each of the above embodiments may be used independently, or one or more of the above embodiments may be combined.

According to the embodiments of the present application, an accurate tissue boundary can be acquired efficiently so as to further provide a reference for analysis on internal and external tissue of a tumor.

A third embodiment of the present application provides an electronic device, including the tissue boundary determination apparatus 1100 according to the embodiment of the second aspect, and the content thereof is incorporated herein. The electronic device may be, for example, a computer, a server, a workstation, a laptop computer, a smart phone, etc., but this embodiment of the present application is not limited thereto.

Figure 12:
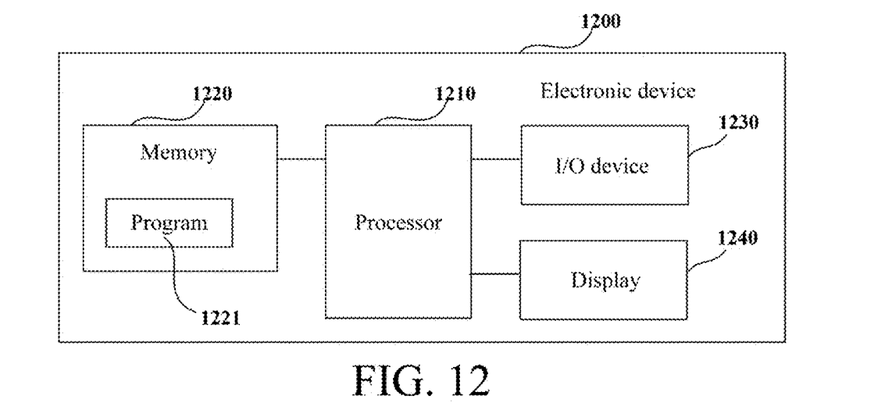
FIG. 12 is a schematic diagram of an electronic device according to an embodiment of the present application.

FIG. 12 is a schematic diagram of the electronic device according to an embodiment of the present application. As shown in FIG. 12, the electronic device 1200 may include: one or more processors (e.g., a central processing unit (CPU)) 1210 and one or more memories 1220 coupled to the processor 1210. The memory 1220 can store various data. In addition, the memory 1220 further stores a program 1221 for information processing, and executes the program 1221 under control of the processor 1210.

In some embodiments, functions of the tissue boundary determination apparatus 1100 are integrated into and implemented by the processor 1210. The processor 1210 is configured to implement the tissue boundary determination method according to the embodiment of the first aspect.

In some embodiments, the tissue boundary determination apparatus 1100 and the processor 1210 are configured separately. For example, the tissue boundary determination apparatus 1100 can be configured to be a chip connected to the processor 1210, and the functions of the tissue boundary determination apparatus 1100 can be achieved by means of the control of the processor 1210.

For example, the processor 1210 is configured to perform the following control: acquiring multiple slice images of multiple positions of a tissue to be examined; determining, with regard to at least one first selected slice image of the multiple slice images, a tissue boundary on the first selected slice image; and determining, according to the tissue boundary on the first selected slice image, tissue boundaries on a predetermined number of other slice images adjacent to the first selected slice image.

In addition, as shown in FIG. 12, the electronic device 1200 may further include: an input/output (I/O) device 1230, a display 1240, etc. Functions of the above components are similar to those in the prior art, and are not repeated herein. It should be noted that the electronic device 1200 does not necessarily include all of the components shown in FIG. 12. In addition, the electronic device 1200 may further include components not shown in FIG. 12, for which reference may be made to the related technologies.

An embodiment of the present application further provides a computer-readable program, wherein when the program is executed in an electronic device, the program causes a computer to execute, in the electronic device, the tissue boundary determination method according to the embodiment of the first aspect.

An embodiment of the present application further provides a storage medium storing a computer-readable program, wherein the computer-readable program causes a computer to execute, in an electronic device, the tissue boundary determination method according to the embodiment of the first aspect.

The above apparatus and method of the present application can be implemented by hardware, or can be implemented by hardware in combination with software. The present application relates to such a computer-readable program that the program, when executed by a logical component, enables the logical component to implement the foregoing apparatus or constituent components, or enables the logical component to implement the various methods or steps described above. The present application also relates to storage media for storing the above program, such as a hard disk, a magnetic disk, an optical disk, a DVD, and a flash memory.

The method/apparatus described with reference to the embodiments of the present application may be directly embodied as hardware, a software module executed by a processor, or a combination thereof. For example, one or more of the functional block diagrams and/or one or more combinations of the functional block diagrams shown in the drawings may correspond to either respective software modules or respective hardware modules of a computer program flow. The software modules may respectively correspond to the steps shown in the figures. The hardware modules, for example, may be implemented by firming the software modules by using a field programmable gate array (FPGA).

The software modules may be located in a RAM, a flash memory, a ROM, an EPROM, an EEPROM, a register, a hard disk, a portable storage disk, a CD-ROM, or any storage medium in other forms known in the art. One storage medium may be coupled to a processor, thereby enabling the processor to read information from the storage medium and to write information to the storage medium, or the storage medium may be a component of the processor. The processor and the storage medium may be located in an ASIC. The software module may be stored in a memory of a mobile terminal, or may be stored in a storage card that can be inserted into the mobile terminal. For example, if a device (e.g., a mobile terminal) adopts a large-capacity MEGA-SIM card or a large-capacity flash memory apparatus, the software module can be stored in the MEGA-SIM card or the large-capacity flash memory apparatus.

One or more of the functional blocks and/or one or more combinations of the functional blocks described in the drawings can be implemented as a general purpose processor, a digital signal processor (DSP), an application specific integrated circuit (ASIC), a field programmable gate array (FPGA) or other programmable logic devices, a discrete gate or transistor logic device, a discrete hardware component, or any appropriate combination thereof, for performing the functions described herein. One or more of the functional blocks and/or one or more combinations of the functional blocks described in the drawings can also be implemented as a combination of computation devices, e.g., a combination of a DSP and a microprocessor, a plurality of microprocessors, one or more microprocessors in communication with a DSP, or any other such configuration.

The present application has been described above with reference to the specific embodiments, but a person skilled in the art shall understand that the description is merely exemplary and does not limit the scope of protection of the present application. Those skilled in the art could make various variations and modifications to the present application according to the principle of the present application, and these variations and modifications are also within the scope of the present application.

What is claimed is:

1. A tissue boundary determination apparatus, the apparatus comprising:
an image acquisition unit, used to acquire multiple slice images of multiple positions of a tissue to be examined;
a first boundary determination unit, used to determine, with regard to at least one first selected slice image of the multiple slice images, a tissue boundary on the first selected slice image; and
a second boundary determination unit, used to determine, according to the tissue boundary on the first selected slice image, tissue boundaries on a predetermined number of other slice images adjacent to the first selected slice image;
wherein the multiple slice images are spectral images acquired by performing CT scanning on the multiple positions of the tissue to be examined, and the determination of the tissue boundary on the selected slice image includes:

performing feature extraction on each pixel on the selected slice image to acquire features of all pixels on the selected slice image;

initializing a seed point on the selected slice image; and performing, on the selected slice image, according to the features of all of the pixels on the selected slice image and a pre-configured region expansion criterion, region expansion on the seed point to acquire the tissue boundary on the selected slice image.

2. The apparatus according to claim 1, wherein the apparatus further comprises:

a third boundary determination unit, used to determine, with regard to at least one second selected slice image of the multiple slice images, a second tissue boundary on the second selected slice image; and a fourth boundary determination unit, used to determine, according to the second tissue boundary on the second selected slice image, tissue boundaries on a predetermined number of other slice images adjacent to the second selected slice image, wherein a selection order of the at least one second selected slice image is opposite to a selection order of the at least one first selected slice image.

3. The apparatus according to claim 1, wherein the performance of feature extraction on each pixel on the selected slice image comprises:

calculating a slope of a spectral curve corresponding to the pixel and a mean value of CT values of two points on the spectral curve corresponding to the pixel, and using the slope of the spectral curve and the mean value of the CT values as a feature of the pixel.

4. The apparatus according to claim 1, wherein the performance of feature extraction on each pixel on the selected slice image comprises:

calculating an effective area of a spectral curve corresponding to the pixel and a mean value of CT values of two points on the spectral curve corresponding to the pixel and using the effective area of the spectral curve and the mean value of the CT values as a feature of the pixel.

5. The apparatus according to claim 1, wherein the initialization of a seed point on the slice image comprises:

acquiring a position obtained by means of an input operation performed by an operator on the slice image, and using a pixel in the position as the seed point.

6. The apparatus according to claim 1, wherein the performance, on the selected slice image, of region expansion on the seed point comprises:

acquiring a feature of a boundary pixel of a position where the seed point is located and features of adjacent pixels adjacent to the boundary pixel;

comparing the feature of the boundary pixel with the features of the adjacent pixels, and using an adjacent pixel having a feature difference within a predetermined range as an expansion region of the seed point; and determining whether the pre-configured region expansion criterion is satisfied, if so, then using the expansion region as the tissue boundary on the selected slice image, and otherwise, continuing performing region expansion on the expansion region until the pre-configured region expansion criterion is satisfied.

7. A tissue boundary determination apparatus, the apparatus comprising:

an image acquisition unit, used to acquire multiple slice images of multiple positions of a tissue to be examined;

a first boundary determination unit, used to determine, with regard to at least one first selected slice image of the multiple slice images, a tissue boundary on the first selected slice image; and a second boundary determination unit, used to determine, according to the tissue boundary on the first selected slice image, tissue boundaries on a predetermined number of other slice images adjacent to the first selected slice image;

wherein the determination of tissue boundaries on a predetermined number of other slice images adjacent to a selected slice image comprises:

copying the tissue boundary on the selected slice image to a slice image adjacent to the selected slice image;

shrinking the tissue boundary on the adjacent slice image; and using the shrunk tissue boundary as a basis and performing, on the adjacent slice image, according to features of all pixels on the adjacent slice image and a pre-configured region expansion criterion, region expansion on the shrunk tissue boundary to form a final tissue boundary on the adjacent slice image.

8. A tissue boundary determination method, comprising:

acquiring multiple slice images of multiple positions of a tissue to be examined;

determining, with regard to at least one first selected slice image of the multiple slice images, a first tissue boundary on the first selected slice image;

determining, according to the first tissue boundary on the first selected slice image, tissue boundaries on a predetermined number of other slice images adjacent to the first selected slice image;

determining, with regard to at least one second selected slice image of the multiple slice images, a second tissue boundary on the second selected slice image; and determining, according to the second tissue boundary on the second selected slice image, tissue boundaries on a predetermined number of other slice images adjacent to the second selected slice image, wherein a selection order of the at least one second selected slice image is opposite to a selection order of the at least one first selected slice image.

9. The method according to claim 8, wherein the multiple slice images are spectral images acquired by performing CT scanning on the multiple positions of the tissue to be examined, and the determination of the first tissue boundary on the first selected slice image comprises:

performing feature extraction on each pixel on a selected slice image to acquire features of all pixels on the first selected slice image;

initializing a seed point on the first selected slice image; and performing, on the first selected slice image, according to the features of all of the pixels on the first selected slice image and a pre-configured region expansion criterion, region expansion on the seed point to acquire first tissue boundary on the first selected slice image.

10. The method according to claim 9, wherein the performance of feature extraction on each pixel on the first selected slice image comprises:

calculating a slope of a spectral curve corresponding to the pixel and a mean value of CT values of two points on the spectral curve corresponding to the pixel, and using the slope of the spectral curve and the mean value of the CT values as a feature of the pixel.

11. The method according to claim 9, wherein the performance of feature extraction on each pixel on the first selected slice image comprises:

calculating an effective area of a spectral curve corresponding to the pixel and a mean value of CT values of two points on the spectral curve corresponding to the pixel, and using the effective area of the spectral curve and the mean value of the CT values as a feature of the pixel.

12. The method according to claim 9, wherein the initialization of a seed point on the first selected slice image comprises:

acquiring a position obtained by means of an input operation performed by an operator on the slice image, and using a pixel in the position as the seed point.

13. The method according to claim 9, wherein the performance, on the first selected slice image, of region expansion on the seed point comprises:

acquiring a feature of a boundary pixel of a position where the seed point is located and features of adjacent pixels adjacent to the boundary pixel;

comparing the feature of the boundary pixel with the features of the adjacent pixels, and using an adjacent pixel having a feature difference within a predetermined range as an expansion region of the seed point; and determining whether the pre-configured region expansion criterion is satisfied, if so, then using the expansion region as the first tissue boundary on the first selected slice image, and otherwise, continuing performing region expansion on the expansion region until the pre-configured region expansion criterion is satisfied.

14. The method according to claim 8, wherein the determination of tissue boundaries on a predetermined number of other slice images adjacent to the first selected slice image comprises:

copying the first tissue boundary on the first selected slice image to a slice image adjacent to the first selected slice image;

shrinking the first tissue boundary on the adjacent slice image; and using the shrunk tissue boundary as a basis and performing, on the adjacent slice image, according to features of all pixels on the adjacent slice image and a pre-configured region expansion criterion, region expansion on the shrunk tissue boundary to form a final tissue boundary on the adjacent slice image.

* * * * *